United States Patent [19]

Hodosh

[11] 3,863,006

[45] Jan. 28, 1975

[54] METHOD FOR DESENSITIZING TEETH

[76] Inventor: Milton Hodosh, 145 Whitemarsh St., Providence, R.I. 02906

[22] Filed: Jan. 29, 1973

[21] Appl. No.: 327,758

[52] U.S. Cl. .............................................. 424/49
[51] Int. Cl. .............................................. A61k 7/16
[58] Field of Search ................................ 424/49–58

[56] References Cited
OTHER PUBLICATIONS

Manly et al., J. Dental Research, Vol. 28, pages 161 & 167, 4/1949.

Merck Index, 7th ed., published by Merck & Co., Rahway, N.J., 1960, page 843.

*Primary Examiner*—Richard L. Huff
*Attorney, Agent, or Firm*—Salter & Michaelson

[57] ABSTRACT

A compound and method for desensitizing hypersensitive teeth, and specifically hypersensitive dentin and cementum, the essential ingredient of said compound comprising a nitrate of potassium, lithium or sodium, and the method comprising the application of said compound in aqueous solution or nontoxic paste form to the sensitive area.

6 Claims, No Drawings

METHOD FOR DESENSITIZING TEETH

BACKGROUND AND SUMMARY OF THE INVENTION

The present invention relates to a compound and treatment for eliminating or, at the very least, greatly reducing, discomfort and pain caused by tooth hypersensitivity or exposed cementum and/or dentin.

It is becoming increasingly apparent that the problem of tooth hypersensitivity affects a far greater number of people than previously suspected. People suffering from this annoying condition may react painfully to heated or chilled foods, citric acid or sweets, or other every-day stimuli, including toothbrush contact. The problem is especially prevalent in adults who have lost some of the normal protective enamel sheathing on tooth surfaces because of erosion, abrasion, caries, chipping of the enamel, or in whom recession of the gingiva has exposed tooth dentin and/or cementum. However, tooth hypersensitivity is now being found to exist even in the absence of any of the foregoing.

Attempts have heretofore been made to eliminate or at least reduce the painful effects of tooth hypersensitivity or of exposed cementum and/or dentin; but, for various reasons, many of these previous attempts have not been completely successful. For example, silver nitrate is a known desensitizer, but it is such a powerful oxidant that it may burn or otherwise irritate the gum tissues, as well as causing discoloration of the teeth. In another approach, a finely ground paste of dicalcium acid phosphate was rubbed into the exposed, sensitive tooth roots of various patients suffering from hypersensitivity with some success, based on the observation that the paste crystallized and blocked the dentinal tubules, thereby apparently protecting the sensitive, nerve-filled pulp inside. Still another approach involves the use of strontium ions, as disclosed in U.S. Pat. No. 3,122,483 dated Feb. 25, 1964.

In spite of the above, the search goes on for a desensitizer which may be easily and economically produced, which may be easily applied to hypersensitive tooth areas, which is effective in achieving the desired desensitizing function without irritation of the gums and discoloration of the teeth, and which has a longer lasting effect. It is to the accomplishment of these objectives that the present invention is directed.

DESCRIPTION OF THE INVENTION

It has been found that the nitrate of any one of the following alkali metals has amazing and unusual desensitizing action when applied to hypersensitive teeth or exposed dentin and/or cementum. Specifically, potassium nitrate, lithium nitrate, and sodium nitrate have been found to be extremely effective in this regard, and potassium nitrate, in particular, has been found to be both extremely effective and relatively long lasting in its effect. However, lithium nitrate and sodium nitrate are also effective, and none of these nitrates are irritating to the gingiva, nor do they discolor the teeth. Other potassium salts have been tried, but none appear to be as effective as potassium nitrate insofar as desensitizing is concerned. Also, other metal nitrates do not seem to be as effective and satisfactory. Thus, for reasons not completely known, potassium nitrate achieves an unusually effective desensitizing result, and to a somewhat lesser extent, so do the other alkali metal nitrates, namely, lithium nitrate and sodium nitrate.

The other alkali metals, namely, rubidium, cesium, and francium, are extremely rare and expensive and hence are not feasible nor practicable for use in the present invention. In addition, francium is radioactive.

In utilizing potassium nitrate as a desensitizing agent, it is simply necessary to dissolve potassium nitrate crystals in a liquid solution, preferably water; and then the solution so formed is liberally applied to the hypersensitive area by means of cotton or the like. It has specifically been found that an aqueous solution comprising 5 percent by weight of potassium nitrate works extremely well. On the other hand, an aqueous solution comprising 1 percent by weight of potassium nitrate is also effective, but not to the extent that a more concentrated solution is. An aqueous solution of potassium nitrate saturates when the solution contains approximately 20 percent by weight potassium nitrate, and such a saturated solution may also be used, but the results of a saturated solution are not sufficiently beneficial over that of a 5 percent solution to justify the inclusion of the additional potassium nitrate.

As previously stated, the liberal application of an aqueous solution of potassium nitrate to the hypersensitive area results in almost immediate and extremely pronounced desensitization of the hypersensitive area, without any irritation of the gingiva, nor any discoloration of the teeth. In addition, the desensitization effect remains for a relatively long time, and in some cases for days.

In addition to applying the nitrate of potassium, lithium or sodium to the hypersensitive area in the form of an aqueous solution, it is also possible to incorporate the nitrate in a nontoxic paste which would then be applied to the sensitive area. For example, a paste was formulated as follows:

|  | Percent |
| --- | --- |
| Potassium nitrate | 10.0 |
| Water | 36.2 |
| Glycerin | 25.0 |
| Hydroxyethylcellulose | 1.6 |
| Polyoxyethylene sorbitan monolaurate | 2.0 |
| Micronized silica | 24.0 |
| Spearmint oil | 1.0 |
| Saccharin | 0.2 |

(All percentages by weight)

The above paste, which actually has ingredients to function as a toothpaste in addition to performing a desensitizing function, when applied to a hypersensitive area in a patient's mouth, achieves basically the same desensitizing results as where the application is by means of an aqueous solution. More specifically, relatively extreme desensitizing took place without any irritation of the gingivae or discoloration of the teeth. When used in a paste of this type, the compound obviously has a preventive function, as well as a treatment function.

Although it is not positively known whether the desensitizing effect of the potassium nitrate is due to the oxidizing nature of the compound, or whether a crystallization takes place which blocks the dentinal tubules and hence protects the sensitive, nerve-filled pulp located therein, the fact remains that the use of potassium nitrate, and also lithium and sodium nitrate, whether in aqueous or paste form, results in desensitization of the hypersensitive area to an unexpected and surprising degree without adversely affecting said area in any way, and said desensitizing effect has been found to be relatively long lasting.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. The method of desensitizing hypersensitive dentin and cementum by applying thereto an agent, the essential ingredient of which is a nitrate of one of the following alkali metals: potassium, lithium or sodium said nitrate comprising between 1 percent and 20 percent by weight of said agent.

2. The method of claim 1 further characterized in that said nitrate is potassium nitrate in an aqueous solution.

3. The method of claim 2 further characterized in that said potassium nitrate comprises approximately 5 percent (5%) by weight and saturation of said aqueous solution.

4. The method of claim 1 further characterized in that said nitrate is potassium nitrate mixed with a nontoxic paste.

5. The method of claim 4 further characterized in that said potassium nitrate comprises approximately ten percent (10%) by weight of said paste.

6. The method of desensitizing hypersensitive dentin and cementum by applying thereto an aqueous solution, the essential ingredient of which is potassium nitrate, said potassium nitrate comprising between 1% by weight and saturation of said aqueous solution.

* * * * *

REEXAMINATION CERTIFICATE (98th)

United States Patent [19]
Hodosh

[11] B1 3,863,006

[45] Certificate Issued Jun. 21, 1983

[54] METHOD FOR DESENSITIZING TEETH

[76] Inventor: Milton Hodosh, 145 Whitemarsh St., Providence, R.I. 02906

Reexamination Request

No. 90/000,265, Sep. 29, 1982

Reexamination Certificate for:
- Patent No.: 3,863,006
- Issued: Jan. 28, 1975
- Appl. No.: 327,758
- Filed: Jan. 29, 1973

[51] Int. Cl.³ .............................................. A61K 7/16
[52] U.S. Cl. ...................................................... 424/49
[58] Field of Search ................. 424/49, 50, 51, 52, 53, 424/54, 55, 56, 57, 58

[56] References Cited

U.S. PATENTS

| | | | |
|---|---|---|---|
| 3,122,483 | 2/1964 | Rosenthal | 424/55 |
| 3,689,636 | 9/1972 | Svajda | 424/49 |
| 3,699,221 | 10/1972 | Schole et al. | 424/54 |
| 3,988,434 | 10/1976 | Schole et al. | 424/54 |
| 4,191,750 | 3/1980 | Hodosh | 424/127 |
| 4,343,608 | 8/1982 | Hodosh | 433/224 |
| 4,357,318 | 11/1982 | Shah et al. | 424/52 |

FOREIGN PATENT DOCUMENTS

| | | |
|---|---|---|
| 945901 | 4/1974 | Canada. |
| 1014477 | 7/1977 | Canada. |
| 970957 | 5/1965 | United Kingdom. |
| 1466930 | 9/1977 | United Kingdom. |

OTHER PUBLICATIONS

Hoyt et al. J.A.D.A. *30*:1372 1376 Sep. 1943. Use of sodium fluoride for desensitizing dentin.

Toto J. Periodontology *29*:192–194 Jul. 1958. A clinical evaluation of a desensitizing toothpaste.

Meffert J. Periodontology *35*:232–235 May-June 1964. Effect of a strontium chloride dentifice in relieving dental hypersensitivity.

Pritchard (1970) advanced periodontal disease: surgical & prosthetic management pp. 801–813 hypersensitivity hypersensitive teeth.

Gorgas dental medicine (1884) pages 261 and 262.

Rusby et al. The properties and uses of drugs (1930) page 354.

Green et al. J. Periodontol. *48*(10): 667–672 Oct. 1977. Calcium hydroxide and potassium nitrate as desensitizing agents for hypersensitive root surfaces.

Tarbet et al. J. Periodontol *51*(9): 535–540 Sep. 1980. Clinical evaluation of a new treatment for dentinal hypersensitivity.

Tarbet et al. Oral surgery oral medicine & oral pathology *51*(6): 600–602 Jun. 1981. The pulpal effects of brushing with a 5 percent potassium nitrate paste used for desensitization.

Kisuka Chemical Abstracts *52* 13137; (1958) of Japan 9834(56), Nov. 16.

Sair Chemical Abstracts *52* 10460e (1958) of U.S. 2,828,212.

Hashimoto Chemical Abstracts *50* 14138c (1956) of Japan. J. Zootech. Sci. *26*:83–86(1955).

Feuersenger Chemical Abstracts *47* 9513: (1953) of Deut. Lebensm.-Rundschau *49* 131–2(1953).

Klekner Chemical Abstracts *37* 2476(7) (1943) of Z. Untersuch Lebensm. *83*:92.

Riess et al. Chemical Abstracts *21* 2510(9) (1927) of Chem. Zig. *51*:361–363 (1927).

*Primary Examiner*—S. K. Rose

[57] ABSTRACT

A compound and method for desensitizing hypersensitive teeth, and specifically hypersensitive dentin and cementum, the essential ingredient of said compound comprising a nitrate of potassium, lithium or sodium, and the method comprising the application of said compound in aqueous solution or nontoxic paste form to the sensitive area.

REEXAMINATION CERTIFICATE ISSUED UNDER 35 U.S.C. 307.

AS A RESULT OF REEXAMINATION, IT HAS BEEN DETERMINED THAT:

The patentability of claims 1-6 is confirmed.

* * * * *